United States Patent
Zellner et al.

(10) Patent No.: US 6,738,808 B1
(45) Date of Patent: May 18, 2004

(54) ANONYMOUS LOCATION SERVICE FOR WIRELESS NETWORKS

(75) Inventors: Samuel N. Zellner, Dunwoody, GA (US); Mark J. Enzmann, Roswell, GA (US); Robert T. Moton, Jr., Alpharetta, GA (US)

(73) Assignee: Bell South Intellectual Property Corporation, Wilmington, DE (US)

( * ) Notice: Subject to any disclaimer, the term of this patent is extended or adjusted under 35 U.S.C. 154(b) by 651 days.

(21) Appl. No.: 09/606,535

(22) Filed: Jun. 30, 2000

(51) Int. Cl.⁷ ............................................. G06F 13/00

(52) U.S. Cl. ................. 709/223; 709/219; 342/357.1

(58) Field of Search .................. 709/217, 218, 709/219, 223, 238, 249, 311, 313; 342/357.07, 357.08, 357.09, 357.1; 455/404.2, 456.1, 456.3

(56) References Cited

U.S. PATENT DOCUMENTS

| | | | |
|---|---|---|---|
| 5,512,908 A | | 4/1996 | Herrick |
| 5,588,042 A | | 12/1996 | Comer |
| 5,610,973 A | | 3/1997 | Comer |
| 5,625,364 A | | 4/1997 | Herrick et al. |
| 5,663,734 A | | 9/1997 | Krasner |
| 5,852,775 A | | 12/1998 | Hidary |
| 5,961,593 A | * | 10/1999 | Gabber et al. .............. 709/219 |
| 6,085,086 A | * | 7/2000 | La Porta et al. ........... 455/432 |
| 6,101,381 A | | 8/2000 | Tajima et al. |
| 6,138,003 A | | 10/2000 | Kingdon et al. |
| 6,157,829 A | * | 12/2000 | Grube et al. ................. 455/414 |
| 6,184,829 B1 | * | 2/2001 | Stilp ........................... 342/387 |
| 6,311,069 B1 | | 10/2001 | Havinis et al. |
| 6,449,497 B1 | | 9/2002 | Kirbas et al. |
| 6,463,533 B1 | * | 10/2002 | Calamera et al. ........... 713/163 |
| 6,470,378 B1 | * | 10/2002 | Tracton et al. .............. 709/203 |
| 6,484,148 B1 | | 11/2002 | Boyd |
| 6,505,046 B1 | | 1/2003 | Baker |

OTHER PUBLICATIONS

"Wireless Application Protocol", Wireless Internet Today, pp. 1–20, 1999.
U.S. patent application Ser. No. 09/739,339.
U.S. patent application Ser. No. 09/739,162.
U.S. patent application Ser. No. 09/739,340.
U.S. patent application Ser. No. 09/606,534.
U.S. patent application Ser. No. 09/630,134.
U.S. patent application Ser. No. 09/739,315.
Mark Moeglein, et al., "An Introduction to Snap Track Server–Aided GPS Technology", available at http://www.s-naptrack.com/atwork.html, undated.

(List continued on next page.)

*Primary Examiner*—Viet D. Vu
(74) *Attorney, Agent, or Firm*—Shaw Pittman LLP

(57) ABSTRACT

An anonymous location wireless network service for use in a wireless network that tracks the location and identity of network users, such as networks complying with enhanced 911 standards. The service provides content providers with the location of network users without revealing their identities. The service includes a wireless network having a proxy server, a network communication link to a plurality of web sites, and a wireless communication link to a plurality of handheld devices. The proxy server blocks identity by reading the location and identity information of network devices, generating dummy identifications, relating the dummy identifications to the identity information, storing the relationships in a memory storage, and forwarding the location information and dummy identifications to the global computer network. Upon receiving return messages from the global computer network, the proxy server reads the dummy identifications, looks up the related identity information in the memory storage, and forwards the data to the appropriate network devices.

30 Claims, 8 Drawing Sheets

OTHER PUBLICATIONS

"Signal Soft Wireless Location Services", available at http://www.signalsoftcorp.com/products/location_manager.html, printed Dec. 27, 2000.

Microsoft Mobility Developer Conference 2003.

$3^{rd}$ Generation Partnership Project; Technical Specification Group Services and System Aspects; Functional Stage 2 Description of Location Services in UMTS (1999).

* cited by examiner

ANONYMOUS LOCATION SERVICE FOR WIRELESS NETWORKS

BACKGROUND

1. Field of the Invention

The present invention relates to the field of wireless networks, and in particular, to wireless networks that track the location and identity of wireless network devices.

2. Background of the Invention

Enhanced wireless 911 (E911) services help ensure that wireless telephones provide 911 call centers, or Public Safety Answering Points (PSAPs), with vital information necessary to locate and identify a caller in an emergency. To comply with E911 standards promulgated by the Federal Communications Commission (FCC), wireless network providers will soon be required to track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase II requires carriers to provide more precise location information to the PSAP.

Under the FCC rules, wireless networks and the corresponding wireless handheld devices, such as cellular telephones, will provide both the identity and location of the caller to a 911 dispatcher. To provide a caller's identity, the wireless handheld device will furnish a device identification, e.g., a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

In emergency situations, quickly communicating this location and identity information is an invaluable, life-saving tool. Indeed, although the location and identity information is generally perceived as private information, the public policy behind the E911 regulations favors disclosing such private information in hopes of administering the aid a caller needs in an emergency. However, outside of emergencies, most cellular device users view their location and identity information as intimately private, and express strong reservations against involuntary and automatic disclosures such information.

These reservations are not without merit, as wireless network providers have several ways to exploit the location and identity information of network users. For example, a network provider could furnish a retailer with the identities of network users near the retailer's store, so that the retailer, in turn, could send an advertisement to the devices of the nearby network users, encouraging them to stop in and shop at the store. Knowing the identity of a network user, the retailer could also access profiling information on the user from data sources such as auxiliary marketing databases or historical databases chronicling previous business with the user. The profiling information would allow the retailer to provide targeted advertisements that are more likely to attract the user's business. However, in providing the identity information necessary for these targeted advertisements, the wireless network provider risks offending the network users with a significant invasion of privacy.

The wireless network provider therefore faces a dilemma in satisfying two customers with opposing interests: 1) the network users who desire reasonable privacy, and 2) the content providers (e.g., businesses and advertisers) who aim to appeal to the network users by obtaining as much information about the network users as possible. Thus, to appease both customers, a wireless network provider must provide enough information to content providers to promote effective content delivery and advertising, but at the same time must limit such information to guard the network users' privacy.

SUMMARY OF THE INVENTION

The present invention is an anonymous location wireless network service for use in a wireless network that tracks the location and identity of network users, such as networks complying with the E911 standards. The anonymous location wireless network service provides content providers (e.g., businesses and advertisers) with the location information of network users without revealing the identity of those network users. The service enables content providers to deliver (or "push") advertisements that appeal to a certain class of network users based on location. For example, a class of network users could include users in locations convenient to the business's store or to users who have similar interests and who assemble in a single location, e.g., fans attending a sporting event at a stadium. The service also enables network users to query content providers to obtain information about the local area from which they are transmitting (referred to herein as "pull messaging"). Most importantly though, with either push or pull messaging, the service prevents the content provider from learning the identity of a network user and maintains this vital information in strict privacy.

In a preferred embodiment of the present invention, the anonymous location wireless network service includes a wireless network having a proxy server, a network communication link to a plurality of web sites, and a wireless communication link to a plurality of handheld devices. The proxy server includes a memory storage, as an integral or separate component, for storing the device identifications (e.g., MINs—mobile identification numbers) and dummy identifications of network users.

To provide location information, the overall system architecture of the present invention includes a location system. The location system provides the wireless network with position coordinates of a handheld device that indicate where a network user is located. The location system can be a part of the wireless network, can be contained in the handheld devices, or can be a combination of the two. In the preferred embodiment of the present invention, the location system is both a part of the wireless network and is also contained in the handheld devices. For example, a suitable method of determining location as a part of the wireless network is by a Wireless Access Protocol (WAP) location service, or perhaps by triangulation across cell sites or cell sectors. An example of a suitable location system in the handheld devices is a GPS.

In the preferred embodiment of the present invention, the proxy server performs the identity blocking function. Preferably, the proxy server reads the location and identity information of network users, generates a dummy identification, relates the dummy identification to the identity information, stores the relationship in the memory storage, and forwards the location information and dummy identification to the content provider in the global computer network. Upon receiving return messages from the global computer network, the proxy server reads the dummy identification, looks up the related identity information in the memory storage, and forwards the data to the appropriate network user.

As an alternate preferred embodiment of the present invention, instead of using a different dummy identification for the device identification of each device, the dummy identification corresponds to the location of the device. Thus, the proxy server substitutes the location of a device for the identity information and stores the relationship between the device location and device identification in memory. The substituted location could be the same for multiple devices. In this manner, the content provider's response would be a different content addressed to each location. In turn, the proxy server would look up in the memory storage the devices marked with the location to which the content provider addressed the content, would determine the corresponding device identification of each device marked with the location, and would return each different content to the corresponding devices.

In blocking identity, the proxy server acts as an intermediary between the plurality of handheld devices and the global computer network to provide security, administrative control, and caching service (e.g., caches material from popular web sites to reduce access times). Preferably, the proxy server is associated with or is part of a gateway server that separates the wireless network from the Internet. The proxy server could also be associated with a firewall server that separates the wireless network from the public network.

The proxy server communicates with the plurality of handheld devices through the wireless communication link. The proxy server provides routing selection (i.e., what transport bearer is to be used), access control, addressing, protocol conversion (i.e., WML text to WML binary), caching, and transport interface between wireless and wired networks (e.g., WAP stack to traditional IP stack, HTTP/TCP/IP). The proxy server runs one or more of the general operating systems, such as Windows $_{95}$™, Macintosh™, or UNIX™.

Accordingly, it is an object of the present invention to block identity information on wireless networks that track location and identity information, such as wireless networks that comply with E911 standards.

Another object of the present invention is to provide content providers (e.g., businesses and advertisers) with the location information of wireless network users without revealing the identity of those network users.

Another object of the present invention is to protect the identity of wireless network users while still providing a content provider with enough information to promote effective targeted content delivery (e.g., advertising).

Another object of the present invention is to allow wireless network users to query content providers for information relating to a particular location without revealing their identities.

These and other objects of the present invention are described in greater detail in the detailed description of the invention, the appended drawings, and the attached claims.

DETAILED DESCRIPTION OF THE INVENTION

The present invention is an anonymous location service for use in a wireless network that tracks the location and identity of network users. The anonymous location service blocks the identity of a network user and provides only location information to a content provider. The present invention contemplates future enhanced digital cellular networks, in which network users will use digital cellular handheld devices to access data from a global computer network, and in which digital cellular network providers will track the identity and location of each network user.

Figure 1:
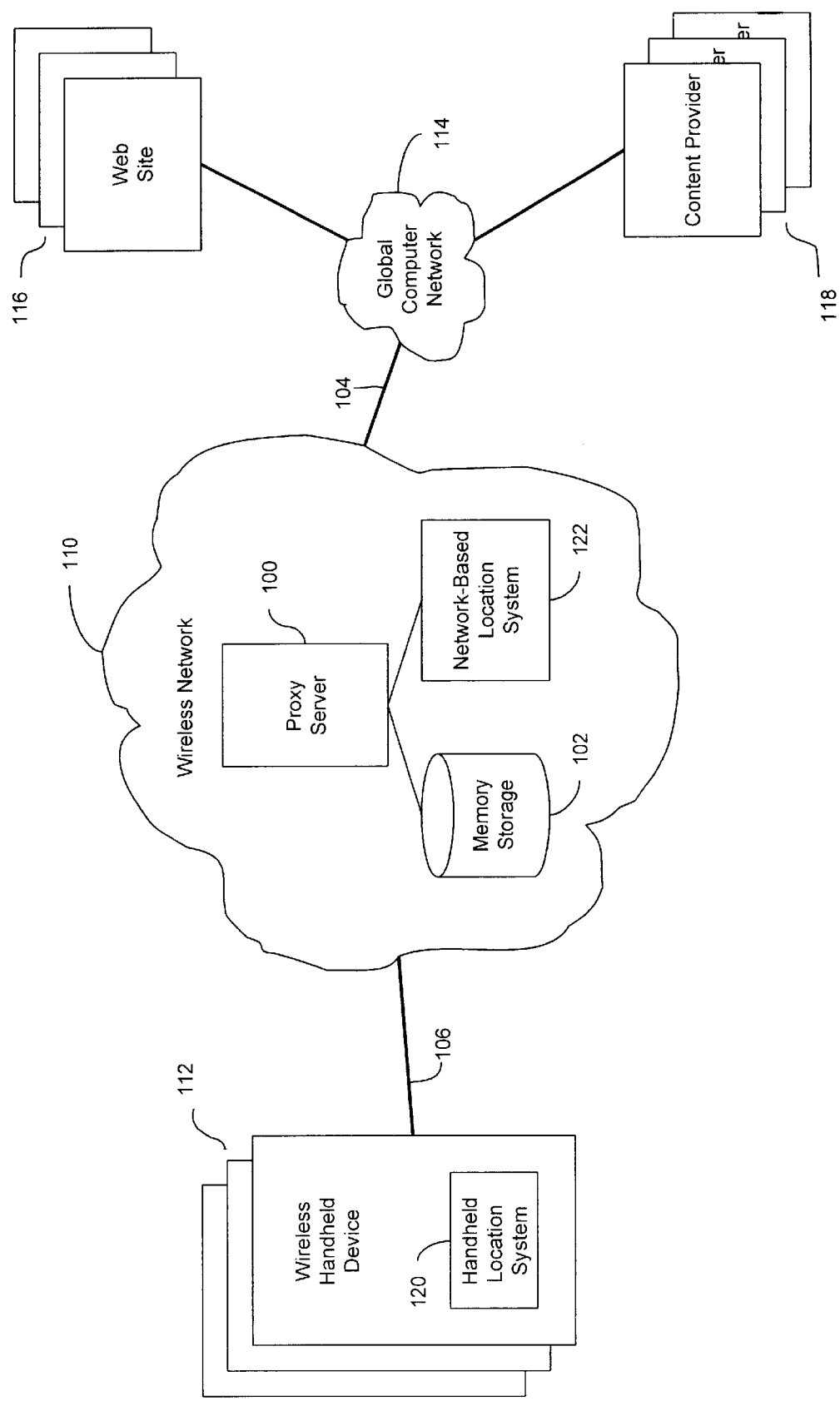
FIG. 1 is a schematic diagram of a system architecture that provides the anonymous location service according to a preferred embodiment of the present invention.

Referring to FIG. 1, the primary components of the present invention include a proxy server 100, memory storage 102, a network communication link 104 to a plurality of web sites, and a wireless communication link 106 to a plurality of handheld devices 112. Each of these components is a part of a wireless network 110.

The system architecture in which the present invention operates further includes a plurality of handheld devices 112 in communication with wireless communication link 106, a global computer network 114 in communication with network communication link 104, and a plurality of web sites 116 and a plurality of content providers 118 in communication with global computer network 114. To track the location of wireless handheld devices 112, the system architecture includes one or both of handheld location systems (e.g., GPS) 120 or a network-based location system 122. Handheld location systems 120 are provisioned in wireless handheld devices 112 while network-based location system 122 is a part of wireless network 110, in communication with proxy server 100.

Proxy server 100 is essential to the present invention. Specifically, proxy server 100 receives, in conjunction with data messages, the location and identity information of wireless handheld devices 112, generates dummy identifications and substitutes the dummy identifications for the device identifications of devices 112, records the dummy identifications and their associated device identifications in memory storage 102, and forwards the data messaging with the location information and dummy identification to web sites 116 and content providers 118 via global computer network 114. On the return path, proxy server 100 receives a return data message from web sites 116 and content providers 118, reads the dummy identifications, consults memory storage 102 to determine the device identification that corresponds to the dummy identification, replaces the dummy identification with the device identification, and forwards the return data message to the appropriate wireless handheld device.

In the preferred embodiment of the present invention, proxy server 100 is a server that is dedicated to providing wireless handheld devices 112 with access to global computer network 114, and ultimately with information content available from web sites 116 and content providers 118. More preferably, proxy server 100 is a Wireless Application Protocol (WAP) server. WAP is an application environment and set of communication protocols for wireless devices designed to enable manufacturer-, vendor-, and technology-independent access to the Internet and advanced telephony services. WAP provides wireless Internet access through all digital cellular networks, giving network users a menu driven method for downloading information, such as flight schedules and bank balances, to cellular telephones from the Internet. WAP is described in WAP version 1.1, which is herein incorporated by reference in its entirety.

Memory storage 102 is a database or other memory storage device that can record relationships between device identifications (e.g., MINs) and dummy identifications. Although shown as a separate component in FIG. 1, memory storage 102 could be contained in proxy server 100.

Wireless handheld devices 112 operate over wireless network 110 and provide means by which to exchange text data. Familiar examples include interactive pagers and cellular telephones with text messaging capabilities. Preferably, devices 112 are WAP-compatible thin clients having thin browsers adapted to communicate with proxy server 100 and to access global computer network 114. Global computer network 114 is preferably the Internet.

The plurality of web sites 116 and the plurality of content providers 118 are also preferably compatible with WAP. Web sites 116 and content providers 118 communicate with devices 112 through global computer network 114 and wireless network 110. As with traditional web sites, content providers 118 and web sites 116 can transmit data to devices 112 in response to a query, or on their own initiative as a push message.

Handheld location system 120 and network-based location system 122 provide proxy server 100 with the locations of wireless handheld devices 112. Depending on the desired degree of accuracy, one or both of the location systems can be used to determine a device's location. The preferred embodiment of handheld location system 120 is individual GPSs provisioned in wireless handheld devices 112. The preferred embodiment of network-based location system 122 is a WAP location service.

With proxy server 100 providing the identity blocking function of the present invention, there are an unlimited number of applications for the anonymous location service. For clarity, set forth below are two examples of how the preferred embodiment of the present invention is implemented in different situations: 1) in response to a network user's query for information related to her location (pull messaging), or 2) in response to a content provider's desire to push messages to network users in a particular location (push messaging). In each example, proxy server 100 receives the location and identity information of wireless handheld devices 112 and forwards only the location information to web sites 116 and content providers 118 via global computer network 114. Proxy server 100 obtains the location and identity information of devices 112 by monitoring a user's accessing of the network (e.g., browsing the Internet), by querying devices 112 on its own initiative, or by querying devices 112 at the request of web sites 116 and content providers 118.

Although these examples best illustrate the identification blocking feature of the present invention, one of ordinary skill in the art would appreciate that the anonymous location service is applicable to other wireless network messaging situations in which a caller on a network that tracks location and identity wishes to keep her identity private. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 2A:
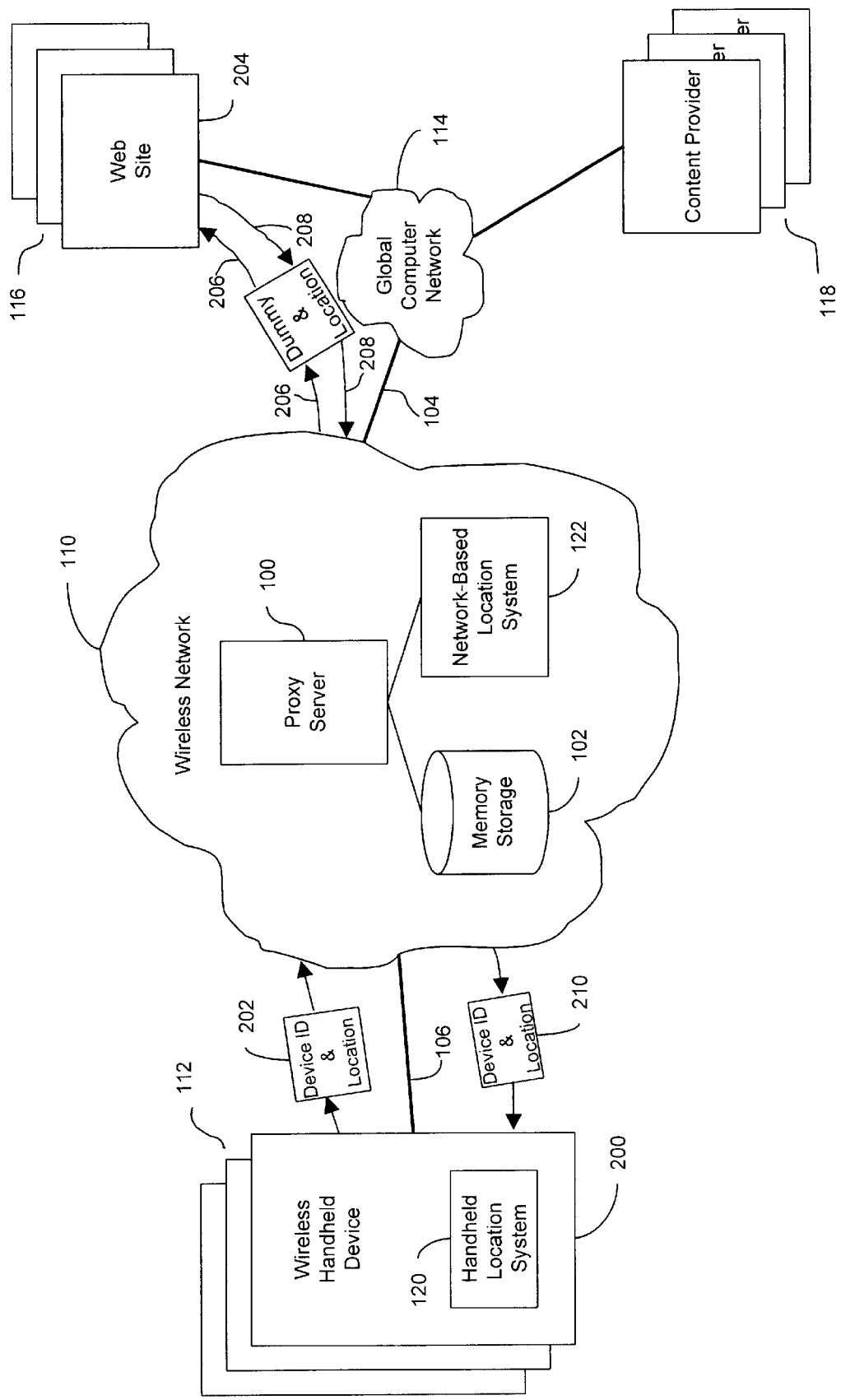
FIG. 2a is a schematic diagram of the system architecture illustrated in FIG. 1, showing the provision of an anonymous location service for pull messaging.
Figure 2B:
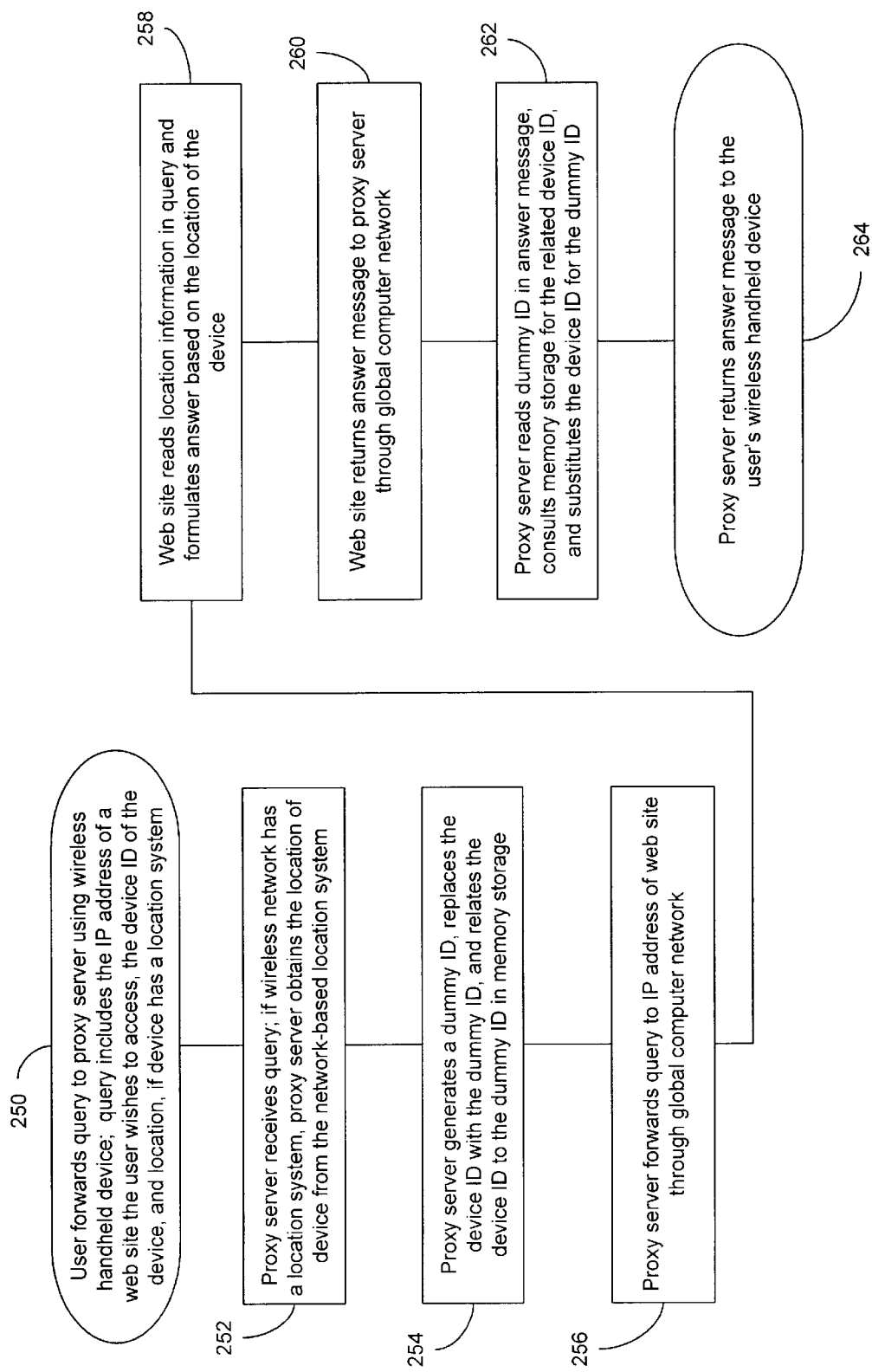
FIG. 2b is a flow chart corresponding to FIG. 2a, which traces the steps for providing anonymous location service for pull messaging.

In the case of a user query (pull messaging), as shown in FIGS. 2a and 2b, wireless handheld device 200 forwards a query 202 to proxy server 100 (step 250 in FIG. 2b). Query 202 contains the IP address of a web site 204 that the user wishes to access, the device identification of device 200, and, if device 200 includes handheld location system 120 (e.g., a GPS), the location of the device. Optionally, as shown in step 252, if the location system is a part of wireless network 110, proxy server 100, upon receipt of query 202, obtains the location of device 200 from network-based location system 122. Having the location and identity (e.g., MIN) of handheld wireless device 200, in step 254, proxy server 100 generates a dummy identification, replaces the device identification with the dummy identification, and relates the device identification to the dummy identification in memory storage 102. In step 256, proxy server 200 then forwards query 206 to the IP address of web site 204 through global computer network 114.

In step 258, the web server of web site 204 reads the location information associated with query 206 and formulates an answer based on the location of device 200. The web server of web site 204 then returns an answer message 208 to proxy server 100 through global computer network 114, in step 260. Then, in step 262, proxy server 100 reads the dummy identification in answer message 208, consults memory storage 102 for the related device identification, and substitutes the device identification for the dummy identification. Finally, in step 264, proxy server 100 returns answer message 210 to the user's device 200. Thus, by removing and replacing the device identification, proxy server 100 blocks the identity of the network user from reaching the external web server of web site 204.

Figure 2C:
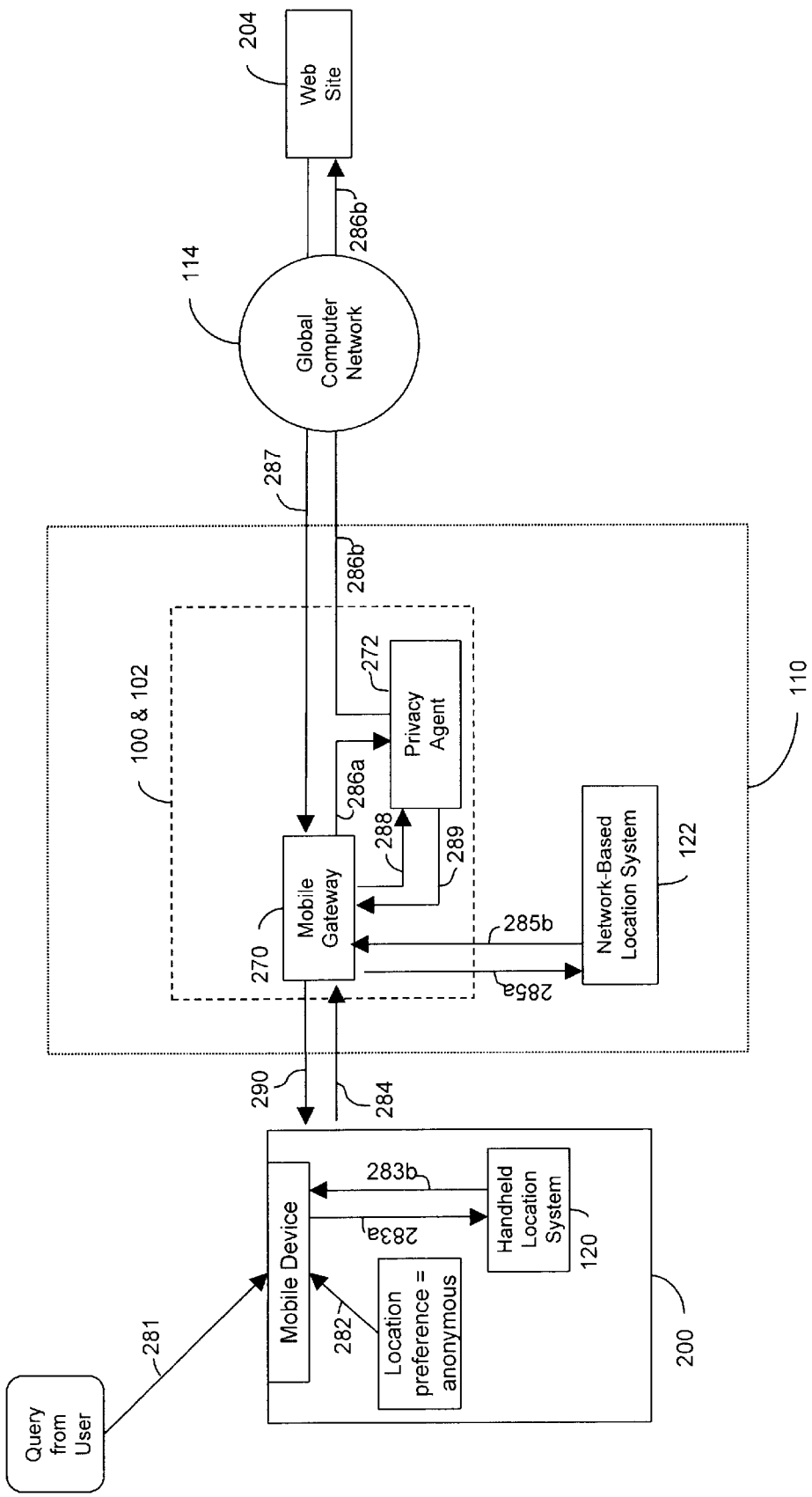
FIG. 2c is a schematic diagram of a specific implementation of the preferred embodiment of the anonymous location service of FIG. 2a for pull messaging.

FIG. 2c illustrates a specific implementation of the anonymous location service for pull messaging. This specific implementation demonstrates one example of how a web server can be blocked from receiving a user's identity, while still receiving and responding to the user's location-dependent query. As an example of a typical query, the user could ask the web server, "Tell me which restaurants are within walking distance of my current location."

As shown in FIG. 2c, the system architecture for this specific implementation corresponds generally to the architecture of FIG. 2a. The dashed lines indicate generally which components of FIG. 2a relate to those of FIG. 2c. For example, mobile gateway 270 and privacy agent 272 perform the functions of proxy server 100 and memory storage 102.

FIG. 2c also shows arrows labeled in sequence, indicating the information flow and process steps of this specific implementation. In step 281, a user initiates a query from his wireless device 200 to the web server of web site 204. The query includes a location request, a device identification for wireless device 200, and a parameter for location preference. The location preference parameter indicates whether the user wants his identity forwarded or wants to remain anonymous. In this example, the user wants to block his identity. Therefore, in step 282, wireless device 200 marks the location preference anonymous. The user can execute this anonymous setting by, for example, configuring the default preference of wireless device 200, or by selecting a manual override (e.g., a menu selection or key sequence).

If wireless device 200 includes a location system, in step 283a, wireless device 200 requests location information from location system 120. In step 283b, location system 120 provides the location information, which wireless device 200 then incorporates into the query to web site 204. If wireless device 200 does not include a location system, then wireless device 200 incorporates a location request message in the query to web site 204. In step 284, wireless device 200 sends the query to mobile gateway 270.

If wireless device 200 does not have a location system and the query includes a location request message, then, in step 285a, mobile gateway 270 queries network-based location system 122 for the location of wireless device 200. The query to location system 122 references the device identification of wireless device 200. In response, network-based location system 122 provides mobile gateway 270 with the location information of wireless device 200, in step 285b.

In step 286a, as mobile gateway 270 forwards the query to web site 204, privacy agent 272 intercepts the message because it is marked anonymous. In step 286b, privacy agent 272 replaces the device identification of wireless device 200 with a dummy identification and forwards the query message to web site 204. At the same time, privacy agent 272 records the association between the device identification and the dummy identification.

In step 287, web server 204 receives the query message via global computer network 114 and sends a response back through network 114. Web site 204 formulates the response based on the location information, and addresses the response to the dummy identification.

In step 288, mobile gateway 270 recognizes that the response message includes a dummy identification and queries privacy agent 272 for the "real" device identification of wireless device 200. In step 289, privacy agent 272 finds the device identification associated with the dummy identification and sends the device identification to mobile gateway 270. Finally, in step 290, mobile gateway 270 sends the response message to wireless device 200, as identified by the device identification.

Figure 3A:
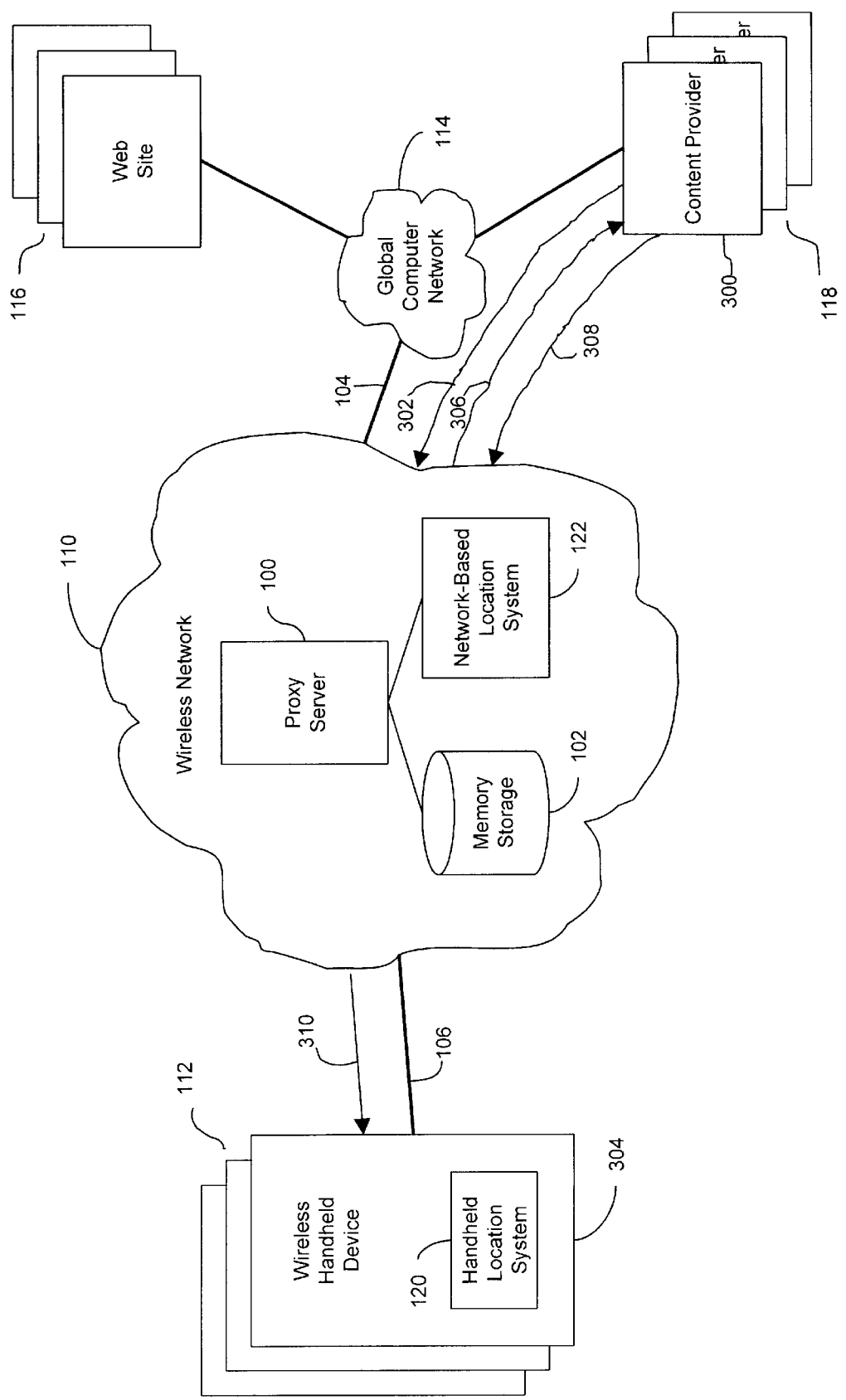
FIG. 3a is a schematic diagram of the system architecture illustrated in FIG. 1, showing the provision of an anonymous location service for push messaging.
Figure 3B:
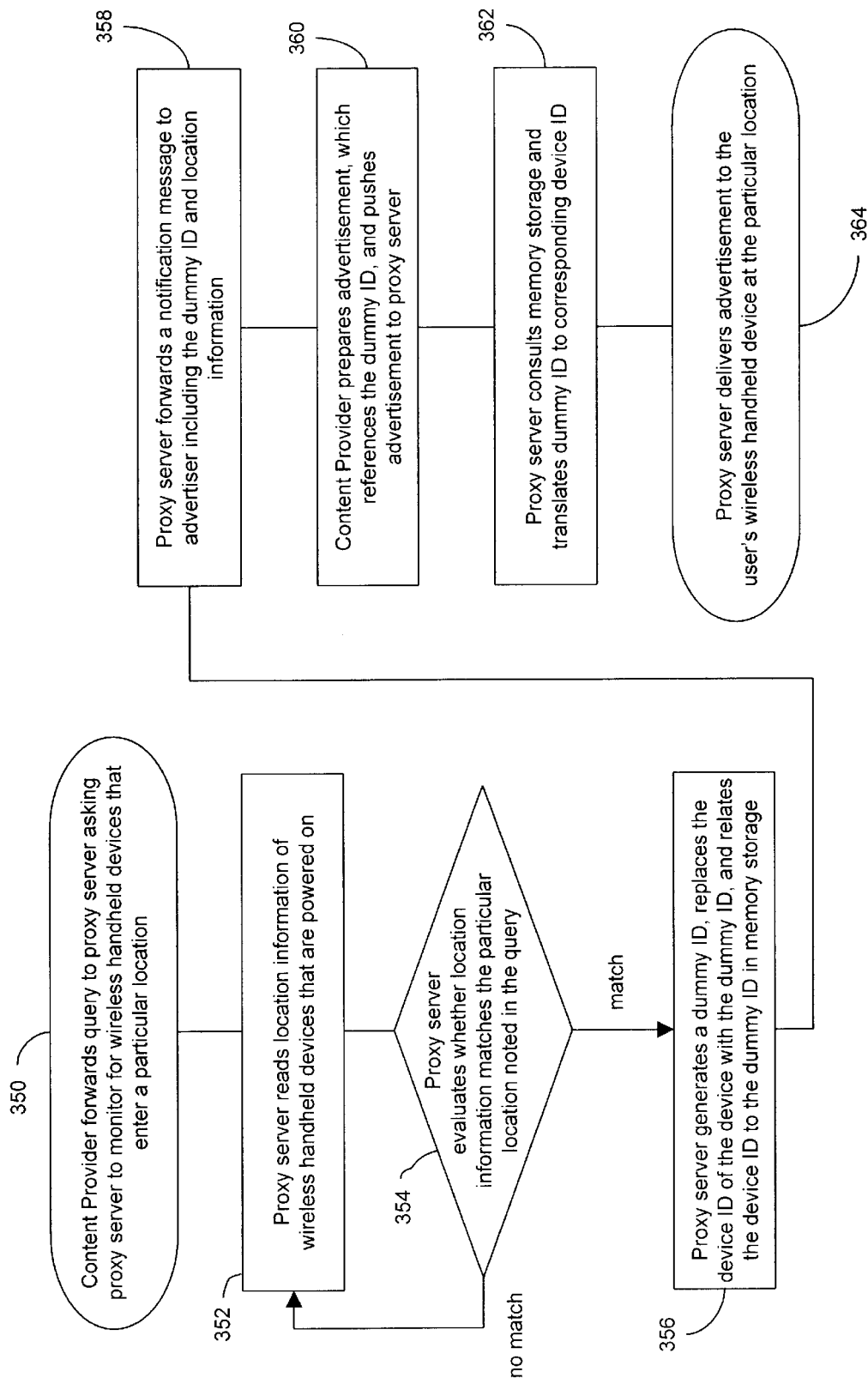
FIG. 3b is a flow chart corresponding to FIG. 3a, which traces the steps for providing anonymous location service for push messaging.

Referring to FIGS. 3a and 3b, for push messages, an external web server, from the plurality of web sites 116 or the plurality of content providers 118, delivers messages to network users in a particular location, without being prompted by user queries. For example, content provider 300 could be a typical Internet advertiser such as Double-Click™. In such a case, as shown in step 350 in FIG. 3b, content provider 300 forwards a query 302 to proxy server 100 asking proxy server 100 to monitor for wireless handheld devices 112 that enter a particular location. In response, in step 352, proxy server 100 reads the location information of wireless handheld devices 112 that are powered on. Network-based location system 122, handheld location system 120, or a combination of both systems provides this location information.

As shown in step 354, proxy server 100 evaluates whether the location information it reads corresponds to the particular location noted in the query by content provider 300. When the location information matches the location corresponding to query 302, proxy server 100 substitutes a dummy identification for the device identification of the wireless handheld device 304 (step 356), as described above for the user query example. Proxy server 100 forwards a notification message 306 to content provider 300 including the dummy identification and location information, in step 358. Then, in step 360, content provider 300 prepares a content message 308 (e.g., an advertisement), which references the dummy identification, and pushes content message 308 back to proxy server 100. In step 362, proxy server 100 translates the dummy identification to its corresponding device identification by consulting memory storage 102. Finally, in step 364, proxy server 100 delivers content message 310 to wireless handheld device 304, which is associated with a network user in the desired location. Thus, proxy server 100 blocks the network user identification so that it never reaches content provider 300.

Figure 3C:
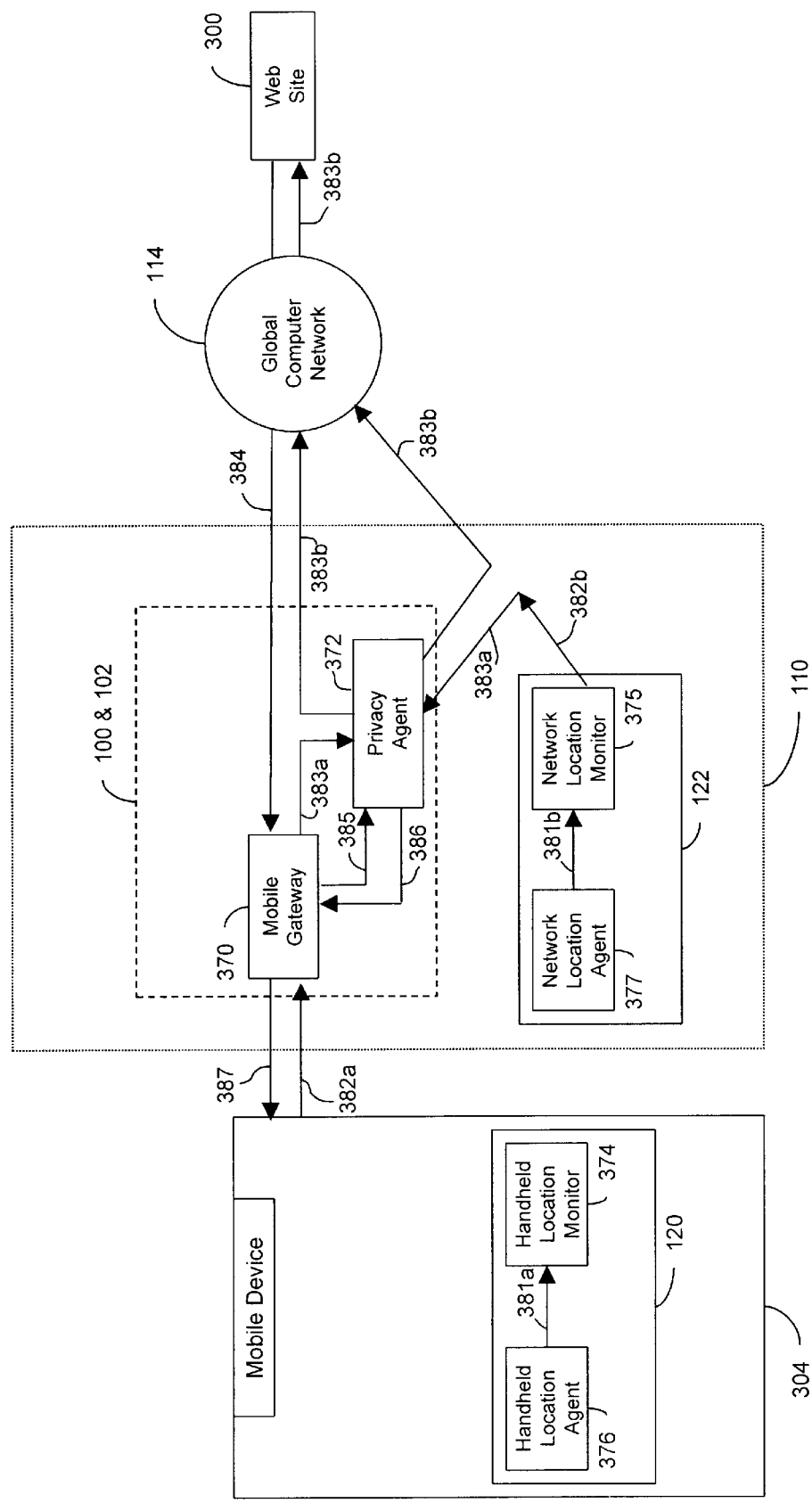
FIG. 3c is a schematic diagram of a specific implementation of the preferred embodiment of the anonymous location service of FIG. 2a for push messaging.

FIG. 3c illustrates a specific implementation of the anonymous location service for push messaging. This specific implementation demonstrates one example of how a web server can be blocked from receiving a user's identity, while still receiving the user's location information and forwarding location-dependent messages. As an example, the web server of content provider 304 could provide alerts or content (e.g., banner advertisements) to a wireless device when the device moves into a targeted area (e.g., a shopping mall).

As shown in FIG. 3c, the system architecture for this specific implementation corresponds generally to the architecture of FIG. 3a. The dashed lines indicate generally which components of FIG. 3a relate to those of FIG. 3c. For example, mobile gateway 370 and privacy agent 372 perform the functions of proxy server 100 and memory storage 102. In addition, as an alternative to the preferred embodiment described in FIGS. 3a and 3b, in which proxy server 100 evaluates whether location information matches a targeted area, this specific implementation monitors for a device in a targeted area using a handheld location monitor 374 in handheld location system 120 or a network location monitor 375 in network-based location system 122. To help illustrate specific processing functions, this specific implementation also includes handheld location agent 376 as a component of handheld location system 120 and network location agent 377 as a component of network-based location system 122.

FIG. 3c also shows arrows labeled in sequence, indicating the information flow and process steps of this specific implementation. The process begins under the assumption that wireless device 304 has chosen the anonymous identity option (i.e., the location preference parameter is equal to anonymous) and that content provider 304 has specified the targeted areas into which it wants to deliver messages to users. In step 381a, if wireless device 304 includes a handheld location system 120, handheld location agent 376 provides handheld location monitor 374 with the location of wireless device 304. If wireless device 304 does not include a handheld location system, network location agent 377 provides network location monitor 375 with the location of wireless device 304 in step 381b.

If wireless device 304 includes handheld location system 120, handheld location monitor 374 determines that wireless device 304 is within the targeted area and has chosen the anonymous option. If wireless device 304 does not include handheld location system 120, network location monitor 375 determines that wireless device 304 is within the targeted area and has chosen the anonymous option.

In step 382a, if wireless device 304 includes handheld location system 120, handheld location monitor 374 initiates an "in the area" message in wireless device 304 and forwards the message to content provider 300 (through mobile gateway 370). Alternately, if wireless device 304 does not include a handheld location system, in step 382b, network location monitor 374 sends an "in the area" message through global computer network 114 to content provider 300. In both steps 382a and 382b, the message also includes a device identification for wireless device 200, and a parameter for location preference. The location preference parameter indicates whether the user wants his identity forwarded or wants to remain anonymous. In this example, the location preference is marked anonymous.

In step 383a, before the message (from either wireless device 304 or network based location system 122) passes to global computer network 114, privacy agent 372 intercepts the message because it is marked anonymous. In step 383b, privacy agent 372 replaces the device identification of wireless device 200 with a dummy identification and forwards the message to content provider 300. At the same time, privacy agent 372 records the association between the device identification and the dummy identification.

In step 384, content provider 300 receives the "in the area" message via global computer network 114 and sends a response (e.g., an alert or content) back through network 114. Web site 204 formulates the response based on the location information, and addresses the response to the dummy identification.

In step 385, mobile gateway 370 recognizes that the response message includes a dummy identification and queries privacy agent 372 for the "real" device identification of wireless device 304. In step 386, privacy agent 372 finds the device identification associated with the dummy identification and sends the device identification to mobile gateway 370. Finally, in step 387, mobile gateway 370 sends the response message to wireless device 304, as identified by the device identification.

FIG. 3c illustrates alternative preferred embodiments of communicating location information to an outside party, e.g., content provider 300. As shown, the communication could be between mobile gateway 370 and content provider 300 or could be between network-based location system 122 and content provider 300. As one of ordinary skill in the art would appreciate, many other solutions to providing this communication are possible, e.g., by direct communication between wireless device 304 and content provider 300.

In the push implementation, proxy server 100 monitors wireless handheld devices 112 that are powered on. In most instances, a network user simply turns on his wireless handheld device and leaves the network interface open to a web page. The initial accessing of the web page or the completion of any other wireless transmission (e.g., placing of a wireless telephone call) provides proxy server 100 with location and identity information. In addition, each time the web page automatically refreshes, or each time the network user enters a browse command, proxy server 100 receives updated location information. In this manner, proxy server 100 can continually monitor for devices that enter a location to which an content provider wants to push content messages.

With regard to both push and pull messages, in most cases, proxy server 100 preferably removes identity information from a user message before the message enters global computer network 114. Removing the identity information within wireless network 110 ensures the greatest privacy, yet still accommodates generic network access needs. For example, a web site would not need the identity of a network user to provide general data, such as stock prices, television guides, and flight schedules. The web site would simply respond to a request for this public information, without regard for the identity of the requesting party.

However, in some cases, web sites must know the identity of a network user to provide private customer-specific information. For example, instead of just stock prices, a network user may want to view the performance of his particular stock portfolio. The web site administering his portfolio would need to know his identity to access the correct portfolio data and to provide the data in a secured transaction. Presumably, the network user would authorize the web site to receive his identity information under the condition that his identity not be passed on to other web sites. However, conflicting with this conditional authorization, these same web sites often sell advertisements off of their web pages in the form of banner ads. Typically, when the network user opens a web page with a banner ad, the web site calls out to the advertiser to have an advertisement downloaded. In this exchange, the advertisers, seeking to maximize effectiveness, ask the web sites for as much information about the network user as possible, including location and identity. The danger is that the web site will relinquish this private identity information to the advertiser.

Figure 4:
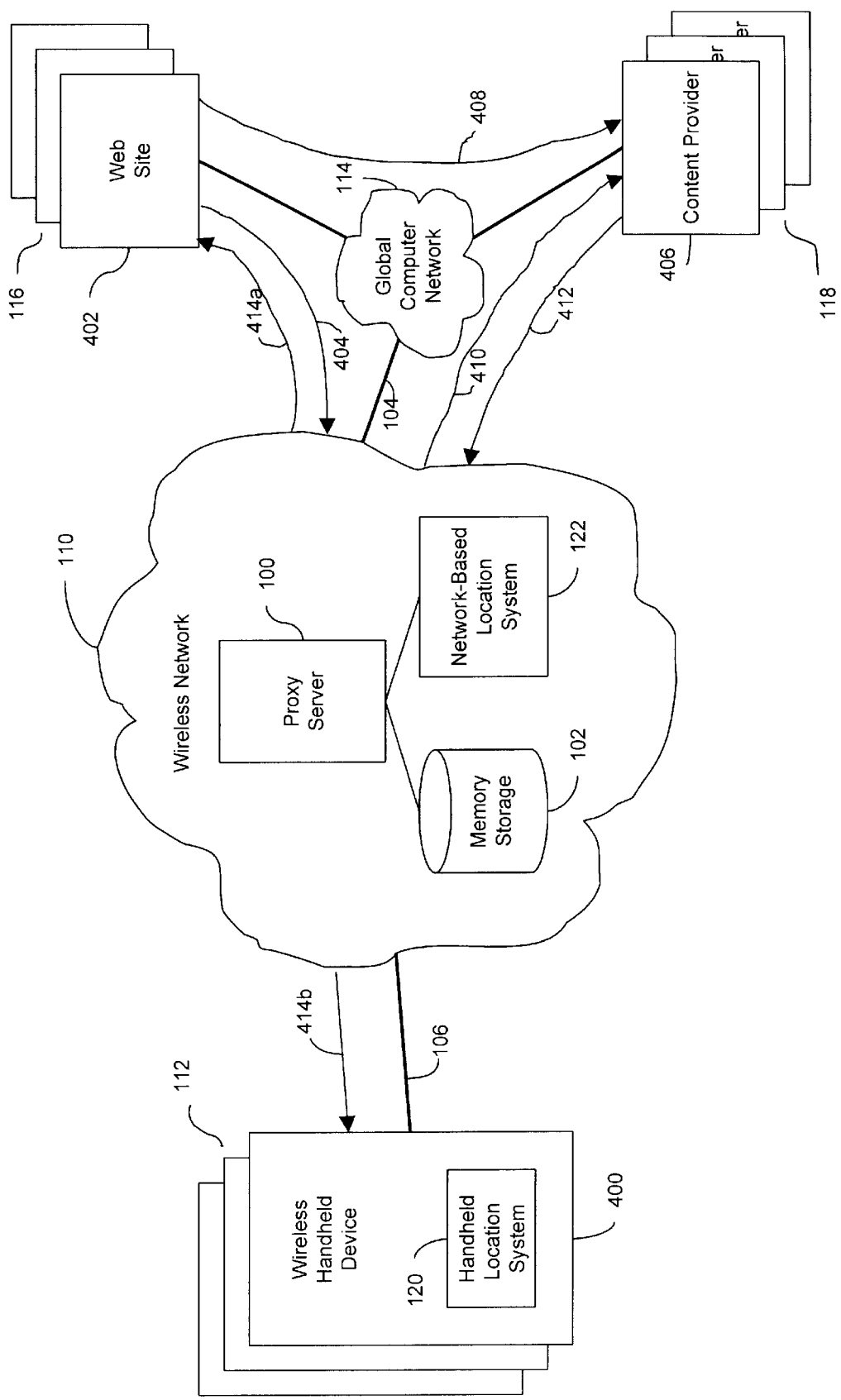
FIG. 4 is a schematic diagram of an alternate embodiment of the system architecture illustrated in FIG. 1, in which the proxy server is used to control the delivery of web page banner advertisements.

FIG. 4 illustrates an alternate preferred embodiment of the present invention that prevents this breach of privacy. Thus, when wireless handheld device 400 accesses web site 402 and opens a web page having a banner ad, web site 402 calls out to proxy server 100 along path 404, instead of directly to content provider 406 along path 408. When proxy server 100 receives the request to insert a banner ad, proxy server 100 substitutes a dummy identification for the device identification, as described above, and forwards the dummy identification and location information to content provider 406 along path 410. Using the location information, content provider 406 returns a targeted content to proxy server 100 along path 412. Proxy server 100 translates the dummy identification embedded in the content into the appropriate device identification, and forwards the content and device identification to web site 402 along path 414a, for display on wireless handheld device 400 along with other content provided by web site 402. Alternately, proxy server 100 could forward the content directly to wireless handheld device 400 along path 414b. Therefore, the private identification information never passes to an unauthorized third party.

In an alternate preferred embodiment of the present invention, the dummy identification that the proxy server associates with a device identification is the location of the device. Thus, instead of using a different dummy identification for the device identification of each device, the dummy identification corresponds to a device's location, which could be the same for multiple devices. Thus, the proxy server substitutes the location of a device for the identity information and stores the relationship between the device location and device identification in memory. In this manner, the content provider's response would be a different content addressed to each location. In turn, the proxy server would look up in the memory storage the devices marked with the location to which the content provider addressed the content, would determine the corresponding device identification of each device marked with the location, and would return each different content to the corresponding devices.

For example, if devices A and B are in location X and device F is in location Y, the proxy server would substitute X for the device identifications of devices A and B, and would substitute Y for the device identification of device F. In memory, the proxy server would associate the identifications of devices A and B to X and the identification of F to Y. The content provider would forward content X' addressed to X and would forward content Y' addressed to Y. Then, the proxy server would read the X and Y addresses, consult the memory for device identifications associated with the X and Y addresses (locations), and forward content X' to devices A and B and content Y' to device F.

Although discussed above in the context of ordinary web sites, one of ordinary skill in the art would appreciate that the present invention is applicable to communications beyond HyperText Markup Language (HTML) and Wireless Markup Language (WML). Indeed, the present invention is applicable to such communications as voice calls and video calls. The true spirit and scope of the invention should not be limited to the web site embodiments described above, but instead should be defined by the claims appended hereto, and by their equivalents.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing an anonymous location service for use in a wireless network that tracks locations and identities of network users, the method comprising:
   receiving the identity of a wireless network device, wherein the identity includes a mobile identification number;
   associating a dummy identification with the identity of the wireless network device into a relationship;
   storing the relationship in memory;
   receiving a message from a web site through a global computer network, wherein the message includes the dummy identification;
   locating the dummy identification in the memory;
   using the relationship to determine the identity of the network device;
   forwarding the message to the network device;
   receiving the location of the wireless network device;
   substituting the dummy identification for the identity of the wireless network device; and
   forwarding the location and the dummy identification of the wireless network device to the web site through the global computer network.

2. The method of claim 1, wherein the receiving identity and the receiving the location are initiated when the network device accesses the global computer network through the wireless network.

3. The method of claim 1, wherein the receiving the identity and the receiving the location are initiated when the network device places a wireless telephone call.

4. A method for providing an anonymous location service for use in a wireless network that tracks locations and identities of network users, the method comprising:
   receiving the identity of a wireless network device, wherein the identity includes a mobile identification number;
   receiving the location of the wireless network device;
   substituting a dummy identification for the identity of the wireless network device; and
   forwarding the location and the dummy identification of the wireless network device to a web site through a global computer network,
   wherein the forwarding further comprises receiving a message from the web site requesting communication with wireless devices in a particular location;
   reading the location of the wireless network device; and
   forwarding the location and the dummy identification of the wireless network device to the web site if the location matches the particular location.

5. The method of claim 1, wherein the dummy identification is the location of the wireless network device.

6. The method of claim 4, wherein the receiving the identity and the receiving the location are initiated when the network device accesses the global computer network through the wireless network.

7. The method of claim 4, wherein the receiving the identity and the receiving the location are initiated when the network device places a wireless telephone call.

8. A method for providing an anonymous location service for use in a wireless network that tracks locations and identities of network users, the method comprising:
   receiving the location and the identity of a network device;
   providing the location and the identity to a first web site, the first web site receiving content;
   receiving a request for content from the first web site including the location and the identity;
   generating a dummy identification and substituting the dummy identification for the identity;
   recording an association between the dummy identification and the identity;
   forwarding to a second web site a modified request for content including the location and the dummy identification, the second web site providing content;
   receiving from the second web site a content that references the dummy identification;
   determining the identity of the network device using the dummy identification and the recorded association;
   replacing the dummy identification referenced in the content with the identity of the network device; and
   forwarding the content including the location and the identity of the network device.

9. The method of claim 8, wherein the forwarding the content further comprising forwarding the content to the first web site.

10. The method of claim 9, further comprising:
    receiving a web page from the first web site including the content; and
    forwarding the web page to the network device.

11. The method of claim 8, wherein the forwarding the content further comprising forwarding the content to the network device.

12. The method of claim 8, wherein a proxy server of the wireless network executes the listed steps.

13. The method of claim 8, wherein the dummy identification is the location of the network device.

14. A system for providing an anonymous location service for use in a wireless network that tracks locations and identities of network users, the system comprising:
- a proxy server having memory storage;
- a plurality of web sites in communication with the proxy server over a global computer network;
- a plurality of handheld devices in communication with the proxy server over the wireless network; and
- a location system in communication with the proxy server,
- wherein the proxy server receives the locations of the network users from the location system, receives the identities of the network users from the plurality of handheld devices, wherein each of the identities includes a mobile identification number, translates the identities of the network users into dummy identifications, and forwards the locations of the network users and the dummy identifications to the plurality of web sites.

15. The system of claim 14, wherein the memory storage is a database separate from the proxy server.

16. The system of claim 14, wherein the global computer network is the Internet.

17. The system of claim 14, wherein the location system is a wireless access protocol location service provisioned in the wireless network.

18. The system of claim 14, wherein the location system is handheld location systems provisioned in the plurality of handheld devices.

19. The system of claim 18, wherein the handheld location systems are global positioning systems.

20. The system of claim 14, wherein the proxy server provides routing selection, access control, addressing, protocol conversion, caching, and transport interface, and the plurality of handheld devices are thin clients with thin browsers.

21. The system of claim 14, wherein the proxy server stores relationships between the identities and the dummy identifications in the memory storage.

22. The system of claim 21, wherein the proxy server receives messages from the plurality of web sites, wherein the messages reference the dummy identifications, wherein the proxy server consults the relationships in the memory storage and uses the dummy identifications to locate corresponding identities of network users, and wherein the proxy server forwards the messages to the corresponding identities.

23. The system of claim 14, wherein the proxy server reads the locations of the network users and forwards the locations of the network users and the dummy identifications to the plurality of web sites only if the locations correspond to a specific location requested by the plurality of web sites.

24. The system of claim 14, wherein the dummy identifications are the locations of the network users.

25. The system of claim 14, wherein the proxy server comprises a mobile gateway and a privacy agent,
- wherein the privacy agent determines if the network users want to block their identities, and if so, translates the identities of the network users into dummy identifications, and
- wherein the privacy agent contains the memory storage and stores relationships between the identities and the dummy identifications in the memory storage.

26. The system of claim 14, wherein the location system comprises a location agent that determines the locations of the network users and a location monitor in communication with the location agent, wherein the location monitor determines if the locations of the network users match a specific location requested by the plurality of web sites.

27. A proxy server for providing an anonymous location service for use in a wireless network that tracks locations and identities of network users, the proxy server comprising:
- a wireless communication link with a plurality of wireless handheld devices;
- a communication link with a global computer network; and
- a memory storage,
- wherein the proxy server receives, as part of data messages, the locations and the identities of the plurality of wireless handheld devices, wherein each of the identities includes a mobile identification number,
- wherein the proxy server-generates dummy identifications and substitutes the dummy identifications for the identities,
- wherein the proxy server records the dummy identifications and their associated identities in the memory storage,
- and wherein the proxy server forwards the data messages with the locations and dummy identifications to web sites via the global computer network.

28. The proxy server of claim 27, wherein the proxy server receives return data messages from web sites,
- wherein the proxy server reads the dummy identifications and consults the memory storage to determine identities that correspond to the dummy identifications,
- and wherein the proxy server replaces the dummy identifications with the identities and forwards the return data message to a corresponding wireless handheld device of the plurality of wireless handheld devices.

29. The proxy server of claim 27, wherein the proxy server is dedicated to providing the plurality of wireless handheld devices with access to the global computer network.

30. The proxy server of claim 27, wherein the proxy server is a Wireless Application Protocol server.

* * * * *